United States Patent
Homem et al.

(10) Patent No.: US 10,734,752 B2
(45) Date of Patent: Aug. 4, 2020

(54) GROMMET FOR SEALING A CABLE IN A CABLE BUSHING AND GROMMET ARRANGEMENT

(71) Applicant: Robert Bosch GmbH, Stuttgart (DE)

(72) Inventors: Francisco Homem, Eindhoven (NL); Berry van Hoof, Helmond (NL); Jakub Dzierzak, Capelle aan den Ijssel (NL)

(73) Assignee: Robert Bosch GmbH, Stuttgart (DE)

( * ) Notice: Subject to any disclaimer, the term of this patent is extended or adjusted under 35 U.S.C. 154(b) by 140 days.

(21) Appl. No.: 15/894,106

(22) Filed: Feb. 12, 2018

(65) Prior Publication Data

US 2018/0231148 A1 Aug. 16, 2018

(30) Foreign Application Priority Data

Feb. 10, 2017 (EP) .................................... 17155521

(51) Int. Cl.
*H02G 3/22* (2006.01)
*H02G 3/08* (2006.01)
*H01R 13/52* (2006.01)

(52) U.S. Cl.
CPC ......... *H01R 13/5205* (2013.01); *H02G 3/083* (2013.01); *H02G 3/088* (2013.01); *H02G 3/22* (2013.01)

(58) Field of Classification Search
CPC .......... H02G 3/083; H02G 3/088; H02G 3/22; H02G 15/013; H01R 13/5205; F16J 15/022; F16J 15/025; F16J 15/104

USPC ......................................... 277/606, 616, 626
See application file for complete search history.

(56) References Cited

U.S. PATENT DOCUMENTS

| | | | | |
|---|---|---|---|---|
| 2,225,472 A | * | 12/1940 | Franklin ................. | H02G 3/083 277/604 |
| 3,161,906 A | * | 12/1964 | Yarm .................... | H02G 3/0616 16/2.1 |
| 4,701,574 A | * | 10/1987 | Shimirak ............. | H02G 15/113 174/77 R |
| 4,940,420 A | * | 7/1990 | Munie ................. | H01R 13/5219 439/271 |
| 5,155,303 A | * | 10/1992 | Bensel, III ........... | G02B 6/4428 174/77 R |

(Continued)

FOREIGN PATENT DOCUMENTS

| | | |
|---|---|---|
| CA | 2325183 | 5/2001 |
| DE | 202006017659 | 8/2007 |

(Continued)

*Primary Examiner* — Nicholas L Foster
(74) *Attorney, Agent, or Firm* — Michael Best & Friedrich LLP

(57) ABSTRACT

A grommet 2 for sealing a cable 4 in a cable bushing 3. The grommet comprises a sleeve body 6, wherein the sleeve body 6 has an inner sealing lip 14 for sealing the cable 4 in the sleeve body 6 and an outer sealing lip 12 for sealing the sleeve body 6 in the cable bushing 3, wherein the sleeve body 6 comprises at least two body parts 7, 7a, 7b, wherein the sleeve body 6 has a detached state and an aligned state, whereby in the detached state the at least two body parts 7, 7a, 7b are detached to insert the cable 4, whereby in the aligned state the at least two body parts 7, 7a, 7b are aligned to form the inner sealing lip 14 and the outer sealing lip 12.

21 Claims, 16 Drawing Sheets

(56) References Cited

U.S. PATENT DOCUMENTS

Figure 1:
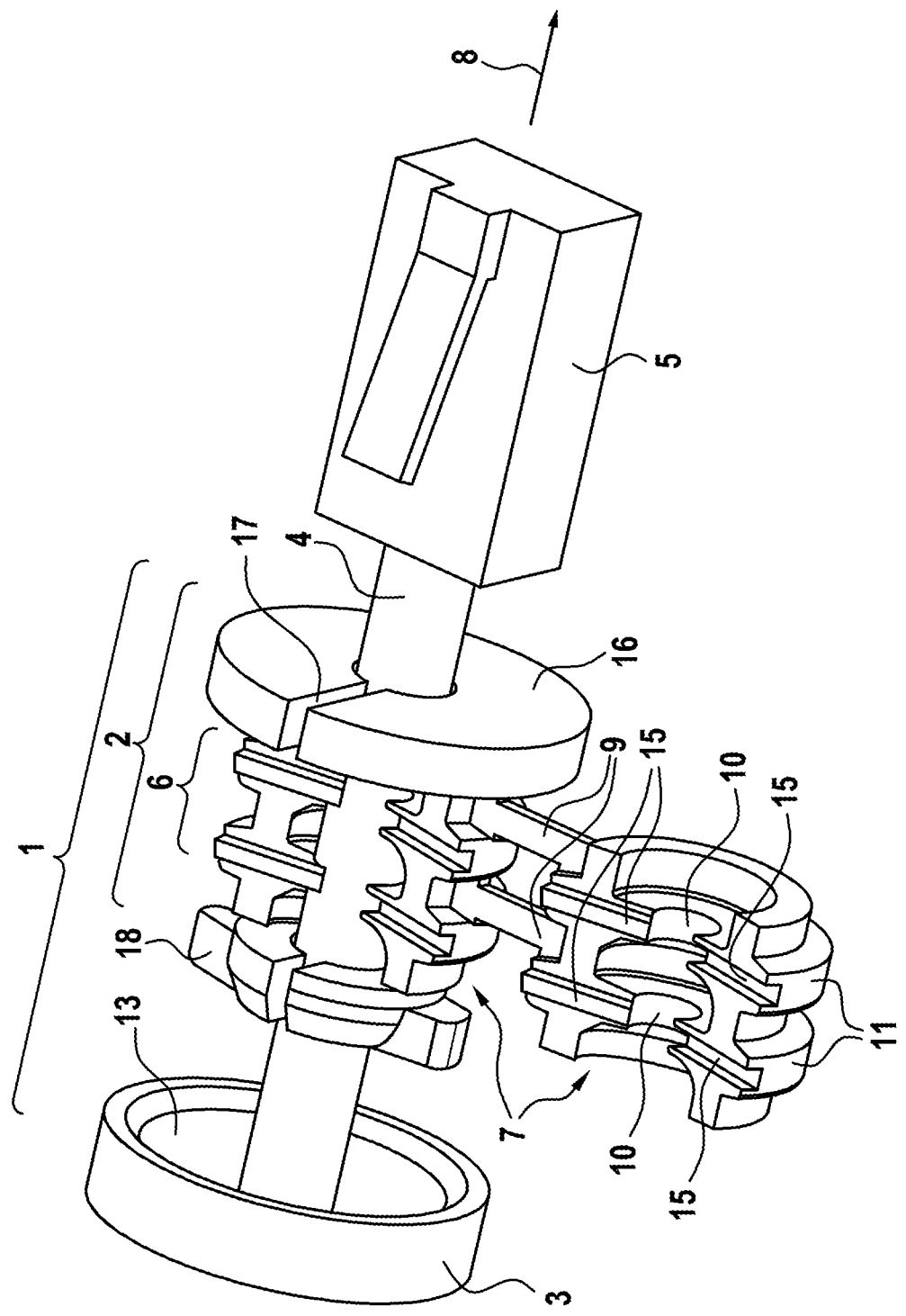

| | | | | |
|---|---|---|---|---|
| 5,235,134 A * | 8/1993 | Jaycox | ............... | G02B 6/4444 |
| | | | | 156/49 |
| 5,451,717 A * | 9/1995 | Itou | .................. | H01R 13/5205 |
| | | | | 174/74 R |
| 5,824,962 A * | 10/1998 | Katsuma | ........... | H01R 13/5205 |
| | | | | 174/135 |
| 6,053,753 A * | 4/2000 | Kunkle | ............. | H01R 13/5221 |
| | | | | 439/275 |
| 7,781,684 B2 * | 8/2010 | Stuckmann | ........... | H02G 3/088 |
| | | | | 16/2.1 |
| 7,988,476 B2 * | 8/2011 | Billman | ............... | H01R 13/622 |
| | | | | 439/271 |
| 9,528,636 B2 * | 12/2016 | Beele | ....................... | F16L 5/10 |
| 2007/0216110 A1 * | 9/2007 | Stuckmann | ........... | H02G 3/088 |
| | | | | 277/607 |
| 2011/0181002 A1 * | 7/2011 | Fujita | ................. | H02G 15/013 |
| | | | | 277/616 |
| 2014/0030919 A1 * | 1/2014 | Fujita | ................. | H02G 15/013 |
| | | | | 439/587 |

FOREIGN PATENT DOCUMENTS

| | | |
|---|---|---|
| FR | 2881287 | 7/2006 |
| NL | 1001028 | 2/1997 |

* cited by examiner

GROMMET FOR SEALING A CABLE IN A CABLE BUSHING AND GROMMET ARRANGEMENT

STATE OF THE ART

The invention concerns a grommet for sealing a cable in a cable bushing, with a sleeve body, wherein the sleeve body has an inner sealing lip for sealing the cable in this sleeve body and an outer sealing lip for sealing the sleeve body in the cable bushing.

One main task in cabling is to seal the cable in the cable bushing against dust and water. Seals for cables are for example needed in sealing CCTV-cameras against waterspray. In the state of the art it is necessary to consider the header on the tip of the cable when using a cable bushing with a sealing. Normally, the header has to be removed before the cable is passed through the sealing of the cable bushing and has to be crimped after passing the sealing. Alternatively, an insert tool is used to pass the header trough the sealing, whereby the insert tool is for example a conical head. Shortcomings in the state of the art of sealing such cable in cable bushings are for example:

- dependence on the user to make sure the sealing area is facing outwards and not inwards
- Dependence on the user that the cable isn't entering at to step angle and of centre
- Difficult to remove the header of the cable to the grommet without damaging the grommet
- Very sensitive to direct waterspray
- Needing of an insert tool

DISCLOSURE OF THE INVENTION

According to the invention a grommet for sealing a cable in a cable bushing with the features of claim 1 is disclosed. Furthermore, a grommet arrangement with the features of claim 14 is disclosed. Preferred and or adventures and bodymants of the inventions are described in the subclaims, the following description and the figures.

According to the invention a grommet for sealing a cable in a cable bushing is disclosed. The grommet is especially a reusable grommet. The grommet is for example for sealing a cable passing a wall point. Preferably, the grommet is for sealing a cable in a cable bushing without removing the header on the tip of the cable. Furthermore, the grommet is for sealing a tube in a cable bushing. Preferably, the grommet is for sealing a cable with a header, whereby the header is on the tip of the cable. The cable is for example a power over ethernet cable, especially a RJ45-cable.

The grommet comprises a sleeve body. The sleeve body is for example a cuff around the cable. Preferably, the sleeve body is a rubber body and/or elastomer body. Especially, the sleeve body has a Shore hardness between 50 and 70. The sleeve body is for example a cylindrical sleeve body and especially a hollow cylinder. The sleeve body has an inner sealing lip for sealing the cable in the sleeve body and has an outer sealing lip for sealing the sleeve body in the cable bushing. Particularly, the sleeve body has more than one inner sealing lip and/or more than one outer sealing lip. Especially, the inner sealing lip and the outer sealing lip can be comprised and/or formed by a combined sealing lip. The sleeve body is preferably a rotational body, whereby the rotational body has a rotational axis, more general a symmetry axis. The cable bushing is for example a hole in the wall, preferably a hole in the wall with an inlet and/or sleeve.

The sleeve body comprises at least two body parts. Preferably, the at least two body parts are geometrical similar and/or congruent. Especially, the sleeve body comprises more than two body part, for example three body parts or four body parts. Preferably, the body parts are and/or are obtained as cuttings through the sleeve body in axial directions.

The sleeve body has a detached state, whereby in the detached state the at least two body parts are detached to insert the cable. Especially, the detached state is an open state of the sleeve body, wherein the sleeve body has an axial opening in the shell surface of the sleeve body. For example, in the detached state the at least two body parts are without any connections to each other and/or are heaving no direct links.

The sleeve body has an aligned state, whereby in the aligned state the two body parts are aligned to form the inner sealing lip and the outer sealing lip. Preferably, in the aligned state the sleeve body has its rotational symmetry, whereby in the detached state the sleeve body has not its symmetry, especially no rotational symmetry. Especially, the cable is fixed in the sleeve body when the sleeve body is in the aligned state.

Advantage of the invention is that the sealing of the cable bushing is easy and user friendly installable, whereby the user has not to consider the header of the cable when installing the cable bushing and/or when fading the cable through the cable bushing. Especially, the header has not to pass the sealing section, whereby the sealing section is protected against damages by the header. The grommet can be used without removing the header of the cable, whereby also no insert tool is needed.

In a prefer embodiment of the invention the body parts are foldable, combinable and/or hinged. Preferably, the body parts are connected with hinges, especially with flexible hinges. For example, the sleeve body comprises two body parts, whereby the two body parts are related and/or connected with a hinge, especially a flexible hinge, whereby in the detached state the flexible hinge is the only connection between the body parts. It is a consideration of the invention to provide a grommet, and/or a sleeve body, which is easily combinable.

In a possible embodiment of the invention, in the aligned state the sleeve body is inclosing a section of the cable. Preferably, the sleeve body is cylindrical inclosing the section of the cable. The section of the cable is preferably smaller than five centimetres, especially smaller than one centimetre and particularly smaller than three millimetres. Especially, in the aligned state the inner sealing lip is facing and/or contacting the section of the cable. Particularly, the inner sealing lip has a sealing area, whereby the sealing area is for example an annular ring, whereby the sealing area is contacting the section of the cable. The sealing lip is preferably a flexible and/or elastic sealing lip, for example made of rubber. Idea of this embodiment is to provide a grommet with a technical easily achievable sealing at the cable, whereby this sealing is sealing the enclosed section of the cable against water, water spray and or dust.

In a preferred embodiment of the invention, each of the body parts has an inner sealing section and an outer sealing section, where in in the aligned state at least two inner sealing sections are contacted to build the inner sealing lip and/or two outer sealing sections are contacted to build the outer sealing lip. Especially, in the aligned state the inner sealing sections are directly contacting the inner sealing sections of adjoined body parts and the outer sealing sections are contacting outer sealing sections of adjoined body parts. For example the inner sealing sections and/or the outer sealing sections are circular segments, whereby in the aligned state the combination of all inner sealing sections and/or outer sealing sections of the sleeve body are forming a circular and/or ring with 360 degrees central angle. Thought of this embodiment is to provide a constructive simple inner sealing lip and/or the outer sealing lip.

Preferably, the inner sealing section is a circular ring segment and/or the outer sealing section is a circular ring segment. Especially, the ring segments of the inner sealing section and/or the outer sealing section have a central angle and an inner diameter. Preferably, the central angle of the inner sealing section is similar and/or identical to the central angle of the outer sealing section. Especially, the central angles of all inner sealing sections and/or outer sealing sections are similar and/or identical. Furthermore, the central angle of the inner sealing section and/or the outer sealing section is for example identical and/or similar to the central angle of the body parts. The inner diameter of the inner sealing lip and/or the inner sealing section is preferably smaller than the outer diameter of the cable, for example three millimetres, four millimetres, five millimetres, six millimetres or seven millimetres. Especially, in the aligned state the inner sealing section and/or the outer sealing section is crumpled to reduce their central angle and/or to increase their inner diameter. Preferably, the ring segments are crumpled to reduce the central angle and/or to enlarge their inner diameter. Particularly, the ring segments, the inner sealing sections and/or the outer sealing sections are crumpled and/or deformed in the way that the sum of the central angles of all the ring segments building an inner sealing lip and/or an outer sealing lip is 360 degrees. For example, for three body parts with an inner sealing section and/or an outer sealing section, whereby in the detached state each of this inner sealing sections and/or outer sealing sections have an central angle of 140 degrees, this ring elements are deformed and/or crumpled to have central angles of 120 degrees in other to maintain. Preferably, the sealing sections are crumpled in a way that the inner diameter of the inner sealing lip fits the outer diameter of the cable and/or that the inner sealing section and/or inner sealing lip is tightly connecting the cable section. Idea of this invention is to provide a grommet that is densely and closely contacting the cable section.

In a preferred embodiment of the invention the sleeve body is formed by two body parts. Especially, the two body parts are ring segments, especially semicircles. In particular, the two body parts have in the detached state central angles larger than 180 degrees, for example central angles between 185 degrees and 200 degrees. Preferably, in the aligned states the two body parts have central angles of 180 degrees, whereby 180 degrees can especially interpreted as 180 degrees plus minus production deviations, for example interpreted as 178 degrees to 182 degrees. Especially, in the aligned states the two body parts are forming a full ring of 360 degrees, especially a full ring without interruptions and/or breaks. Idea of this embodiment is to provide a grommet and/or a sleeve body that is constructive easy to achieve.

In a preferred embodiment of the invention the body parts comprise connection means to maintain a fixed connection of the body parts in the aligned state. Preferably, the connection means are connections means for a reusable and/or solvable connection of the body parts. For example, the connection means are clips, that fix the body parts to build the sleeve body in the aligned. Especially, the connection means are adapted as interfaces that can interact and connect the body parts in the aligned state. It is a consideration of this embodiment, to maintain a fixed connection of the body parts in the aligned state, such that the grommet and/or the sleeve body is mechanical stable when used as a sealing.

Particularly, in the aligned state the body parts, the inner sealing sections and/or the outer sealing sections are connected at contact areas. Particularly, the contact areas are in axial direction of the grommet and/or the sleeve body. The contact areas comprise the contact means, whereby the contact means are for example to intractable interfaces. Preferably, the connecting means are adapted as slot and key, for example as tongue and groove. For example the slot and key are made as rectangular, square ore triangular slot and key. Idea of this embodiment is to provide a grommet and or sleeve body that is easily to produce and/or manufacture, whereby the body parts are already having the connection means at and/or after their production.

In a possible embodiment of the invention the sleeve body has at least two inner sealing lips and/or has at least two outer sealing lips. Particularly, in the aligned state the at least to inner sealing lips are spaced in axial direction of the sleeve body and/or the at least to outer sealing lips are spaced an axial direction of the sleeve body. Preferably, the at least to inner sealing lips and/or at least to outer sealing lips are spaced in axial direction with a distance of more than one millimetre, especially more than three millimetre, and particularly more than eight millimetres. Preferably, the outer sealing lips and the inner sealing lips are spaced in the same way, for example the inner sealing lips and the outer sealing lips are at the same axial position at the sleeve body. Particularly, the sleeve body has two inner sealing lips and/or two outer sealing lips, preferably it has three inner sealing lips and/or outer sealing lips and especially has four inner sealing lips and/or outer sealing lips. Especially, the sleeve body has at least two combined sealing lips, the combined sealing lip comprises the inner sealing lip and the outer sealing lip. Preferably, the number of inner sealing lips is the same as the number of the outer sealing lips. Idea of this embodiment is to provide a grommet with a sleeve body that has more sealing lips than just one, especially a grommet that seals the cable at the section of the cable at more areas, and especially to provide a grommet with improved sealing qualities and/or properties.

Particularly, the grommet comprises a disk element at one and/or at both ends of the sleeve body, especially at the axial ends of the sleeve body. Preferably, the disk element is a hollow cylinder and/or has an inner circular cavity, whereby the inner cavity has a diameter that is similar to the diameter of the cable. The disk element is preferably made of rubber and/or any other elastic material. Alternatively, the disk element is made of a non-elastic material, like aluminium parts designed in a way that allows the cable to be placed inside. The disk element has a thickness, whereby the thickness is the extension of the disk element in axial directions, whereby the thickness of the disk element is preferably larger than one millimetre and especially larger than three millimetres. The disk element is adapted to maintain and/or ensure a particular penetration of the cable in to the sleeve body. Alternatively and/or additionally the disk element is adapted to maintain and/or ensure the penetration of the cable in to the sleeve body under an adjusted and/or adjustable angle. Especially, the disk element is adapted to adjust the angle of penetration of the cable in to the sleeve body. Idea of this embodiment is to provide a grommet that ensures the sealing quality of the grommet by fixing the penetration angle of the cable into the sleeve body.

Particularly, the grommet and/or the sleeve body has indication means for indicating the correct position of the grommet in the cable bushing and/or in the hole. For example the indication means are adapted as indicating notches, whereby for example the indication notches have a radial extension that is larger than the diameter of the hole and/or the cable bushes. Idea of this embodiment is to provide a grommet that ensures the sealing quality by indicating the user the correct installation.

In a preferred embodiment of the invention the sealing lips, the inner sealing lip and/or the outer sealing lip is a protrusion of the sleeve body, where in the protrusion is chamfered towards the sleeve body to reduce its axial flexibility. Particularly, the protrusion is chamfered in axial direction towards the sleeve body. Especially, for chamfering the inner sealing lip the chamfer is facing radial inwardly. Idea of this embodiment is to provide a grommet, especially a sleeve body with reduced axial flexibility when sliding the sleeve body and/or the grommet over the cable.

Preferably, the grommet is a sealing against dust and/or watersplash. Particularly, the grommet is a sealing at the contact of the sleeve body with the cable and of the sleeve body with the hole in the wall and/or with the cable bushing. Particularly, the grommet is a sealing against solid particles, liquids and/or gases. Preferably, the grommet is a sealing according to the IP-Code (International protection marketing, IC-Standard 60529), whereby the grommet is at least a grommet of 1P66 or better. Idea of this embodiment is to provide a grommet that can used in sealing products in nature and/or in free landscape, for example CCTV-Cameras.

Furthermore, the invention concerns and/or comprises a grommet arrangement for feeding a cable through a wall. The grommet arrangement comprises the grommet, especially as descripted before, and a cable bushing. The cable bushing has an inner opening and is attachable in a hole of the wall. The grommet and/or the shell body is mountable in the opening of the cable bushing. The grommet and/or the shell body in its aligned state is sealing the cable in the cable bushing and/or hole when it is arranged and/or mounted in the opening of the cable bushing. The grommet and/or the grommet arrangement is especially adapted to seal the hole in the wall when the cable is fed to the wall. Especially, the grommet and the cable bushing are adapted as interface that can work together. Idea of this object is to provide grommet and cable bushing that can be used to feed a cable through a wall and seal the cable and/or the hole in the wall.

Particularly, the grommet arrangement comprises the cable. The cable has an outer diameter, for example an outer diameter of five millimetres, six millimetres or more. Preferably, the cable is a RJ 45 cable with an outer diameter for example from 4.8 millimetres to 7.5 millimetres. Especially, each of the body parts has an inner sealing section and/or an outer sealing section. Particularly, the inner sealing section and/or the outer sealing section is a ring segment. Especially, the inner diameter of the ring segment is in the detached state the outer diameter of the cable and/or a little bit smaller than the outer diameter of the cable, for example 1.5 millimetres smaller than the outer diameter of the cable. Especially, in the aligned state the ring segments are crumpled to adapt the inner diameter of the ring segments to the outer diameter of the cable, especially to envelop the cable tight. Additionally, the outer sealing section has an outer sealing diameter, whereby the outer sealing diameter is adapted to fit and/or seal the cable bushing and/or the hole in the wall, whereby for example the outer sealing diameter is the diameter of the hole and/or the diameter of the cable bushing.

Further features, advantages and effects of the invention result in the following description of execution examples and/or embodiments of the invention.

Figure 2:
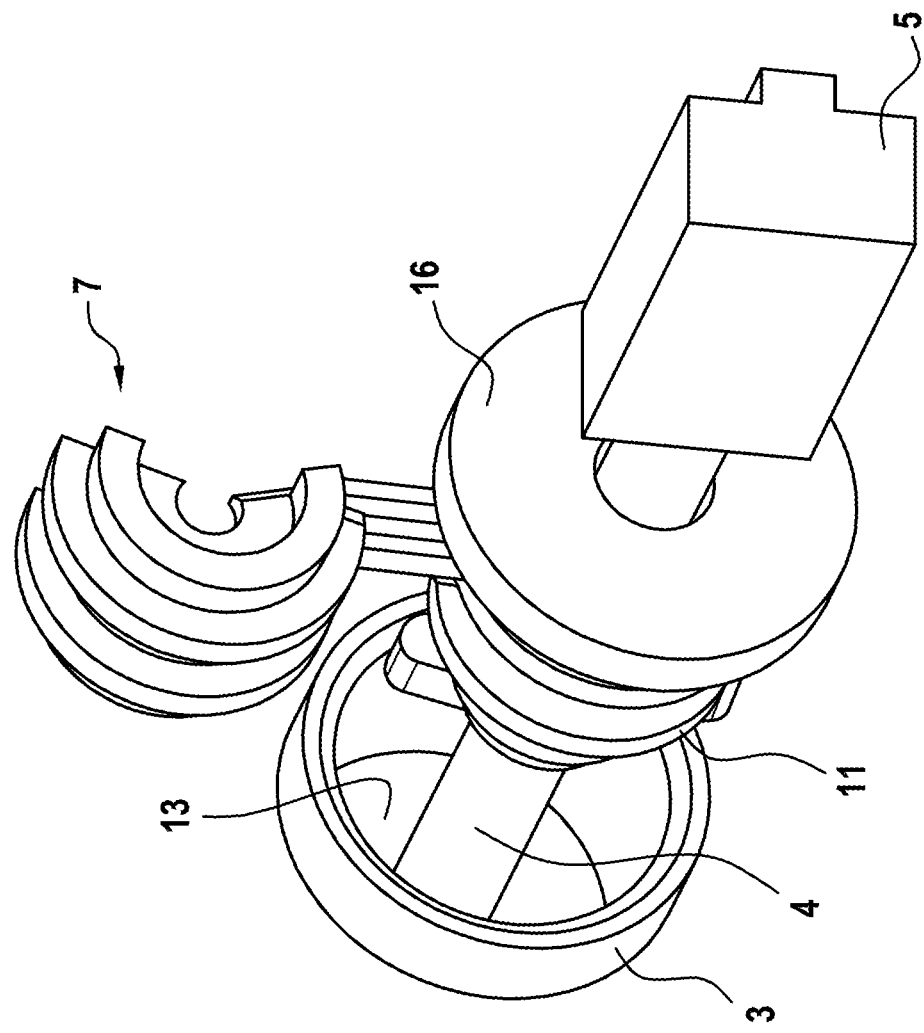
Figure 3:
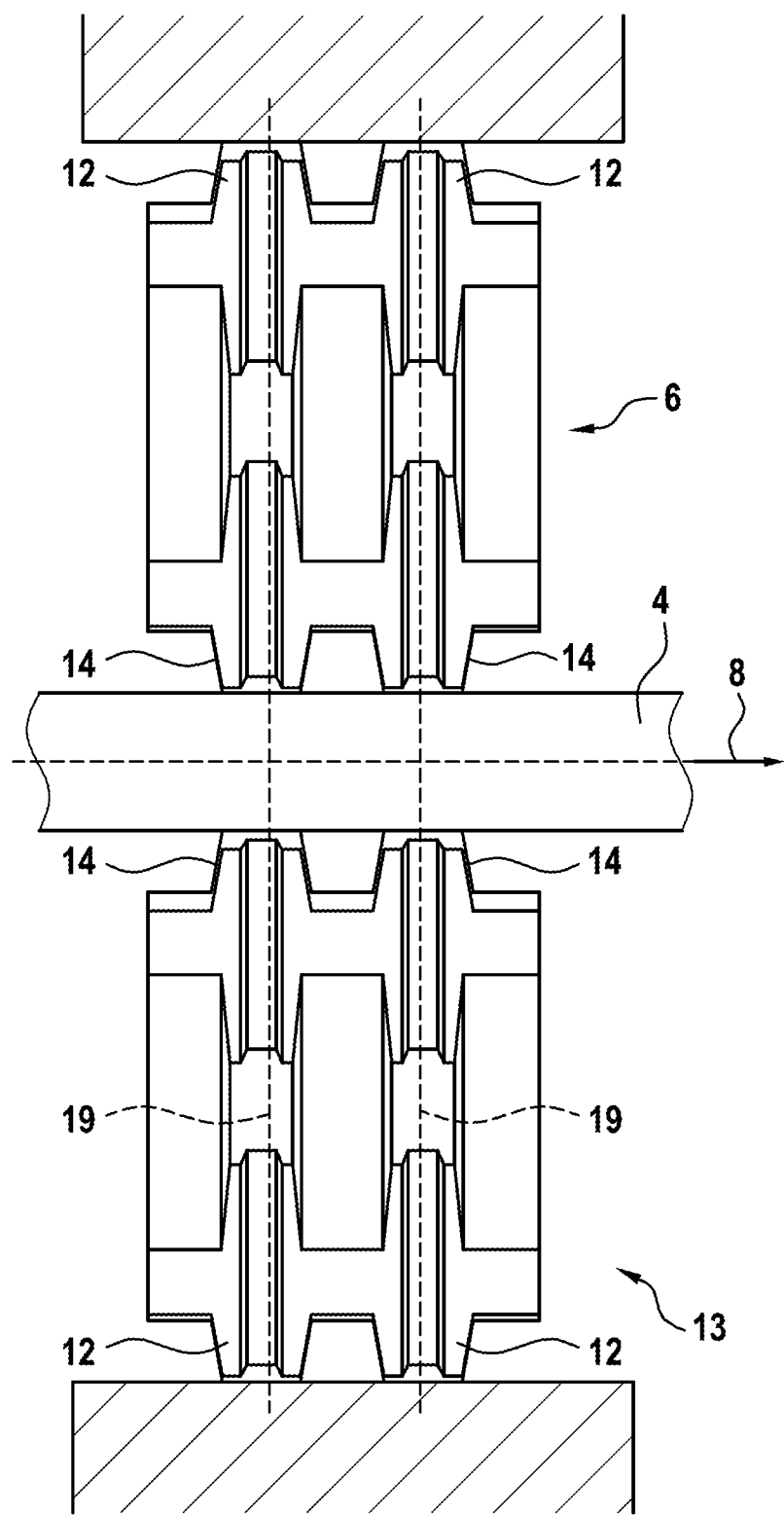
Figure 4:
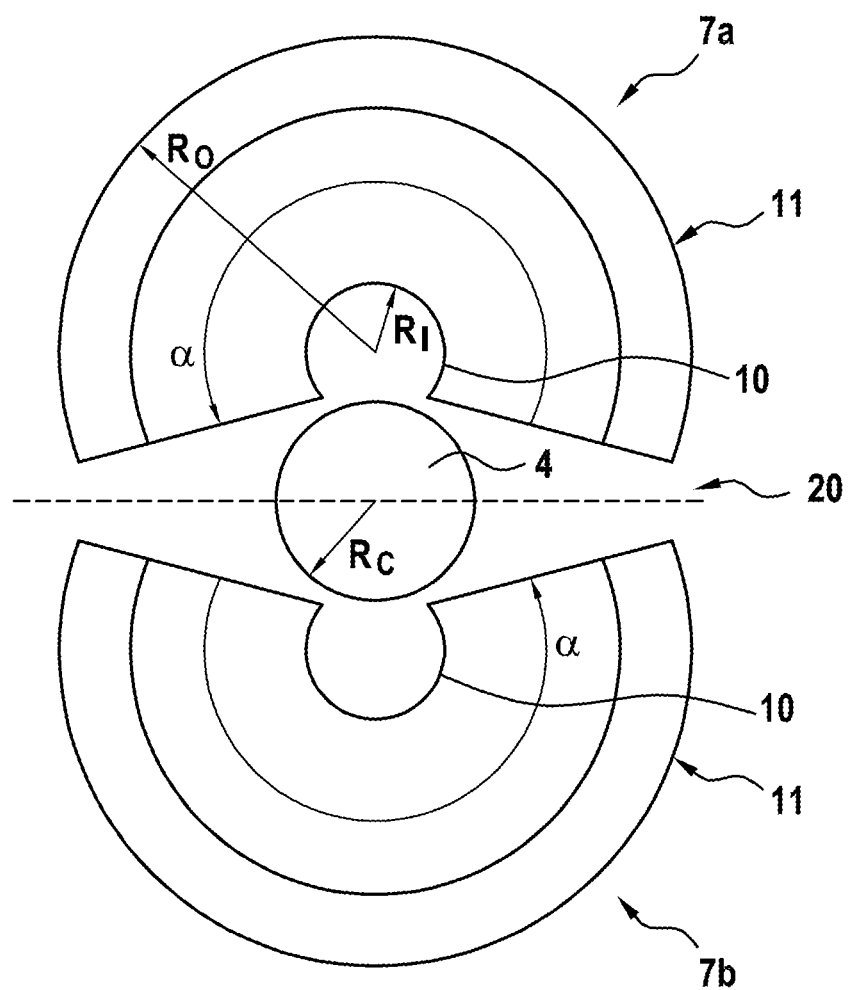
Figure 5:
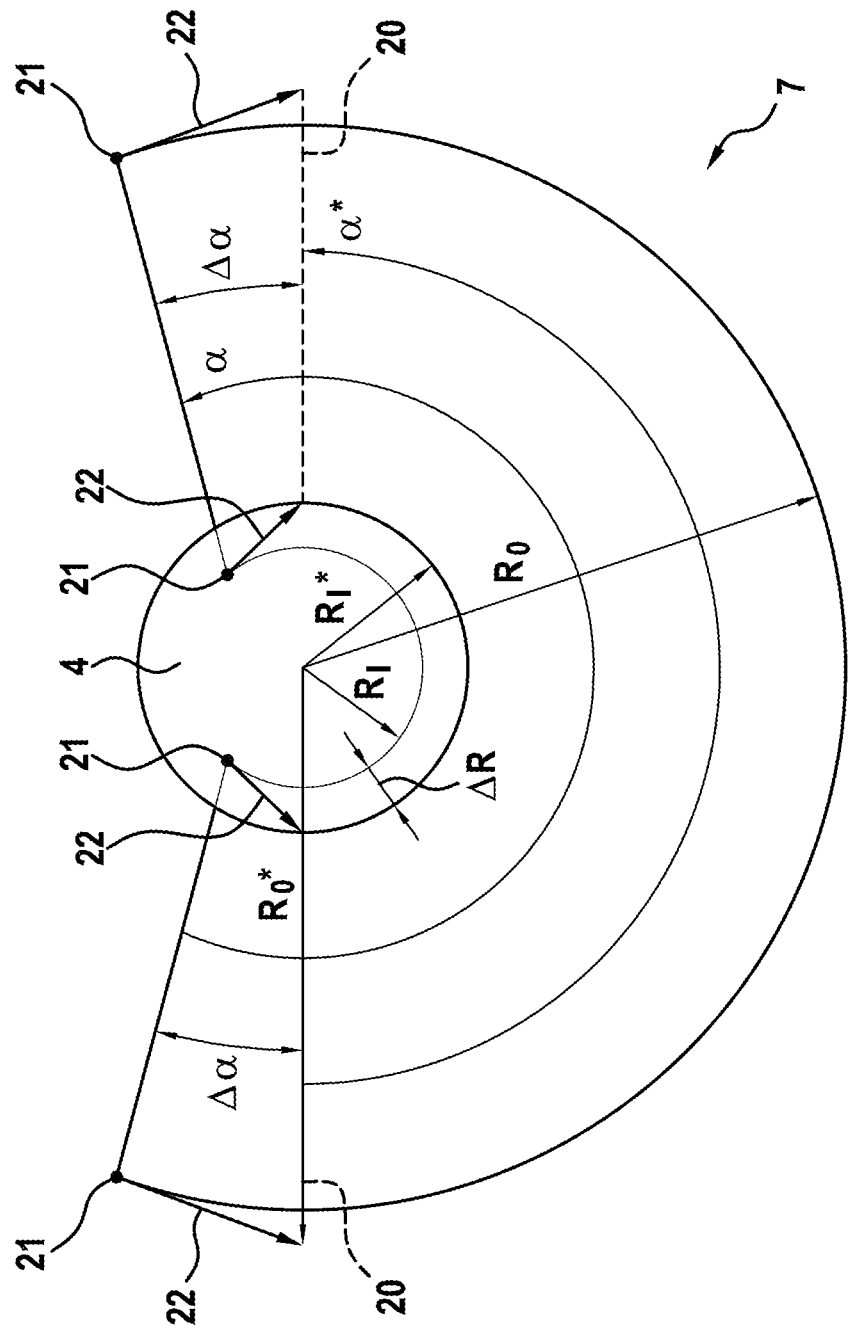
Figure 6:
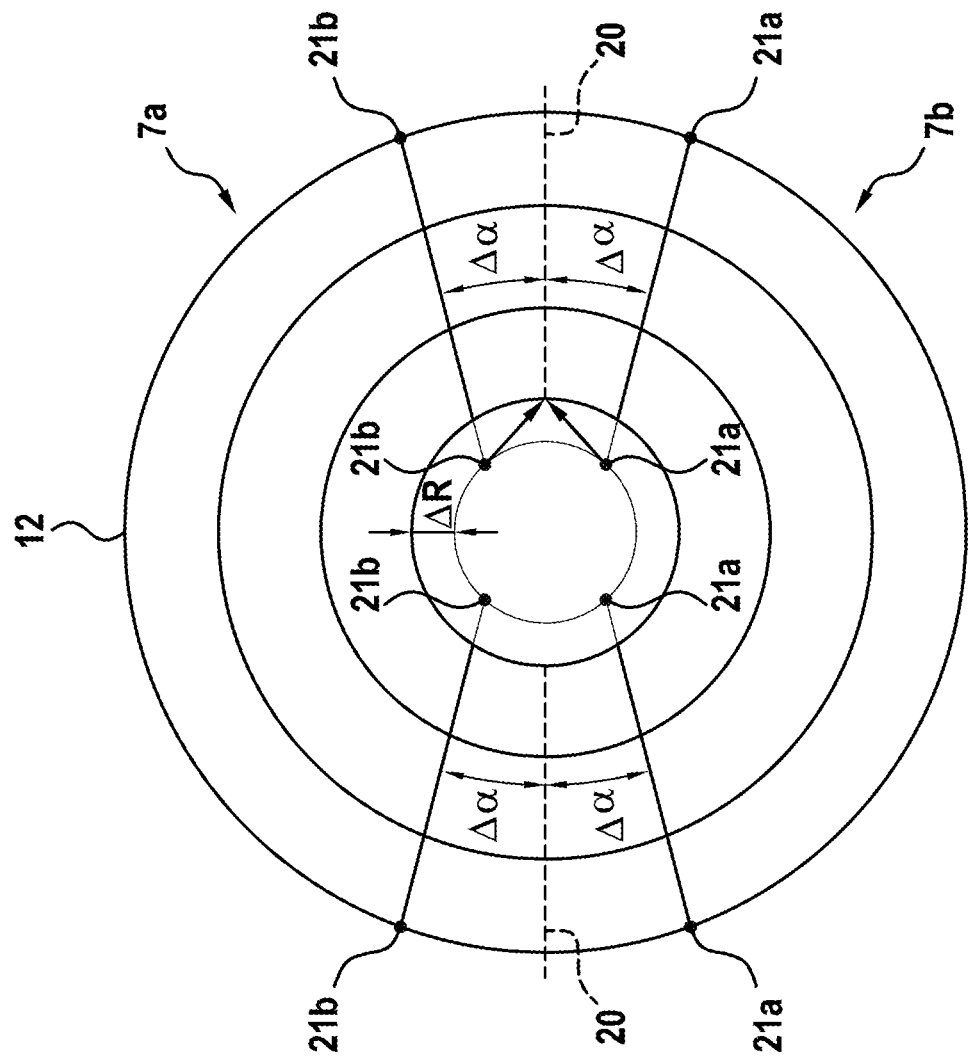
Figure 7:
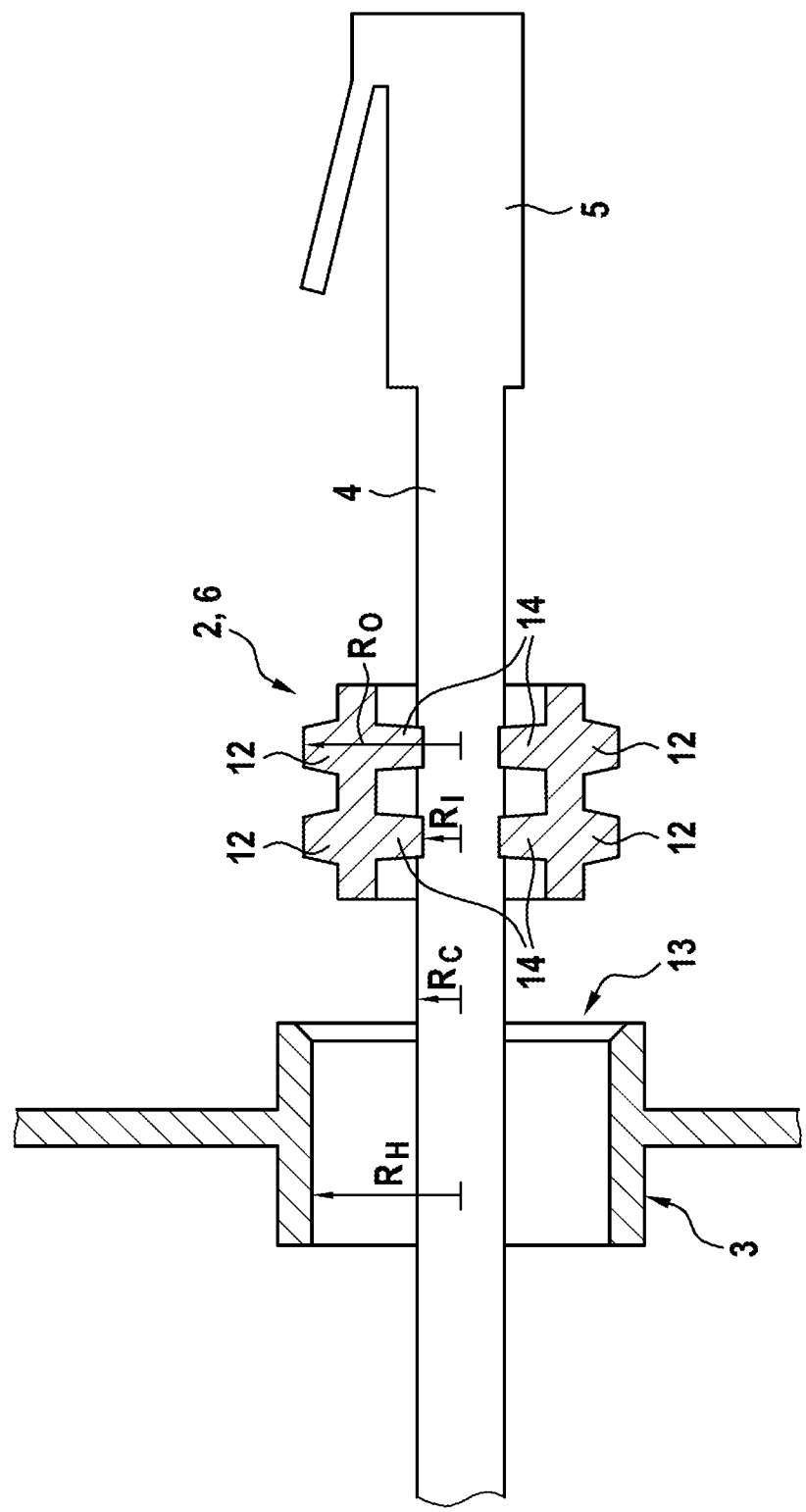
Figure 8:
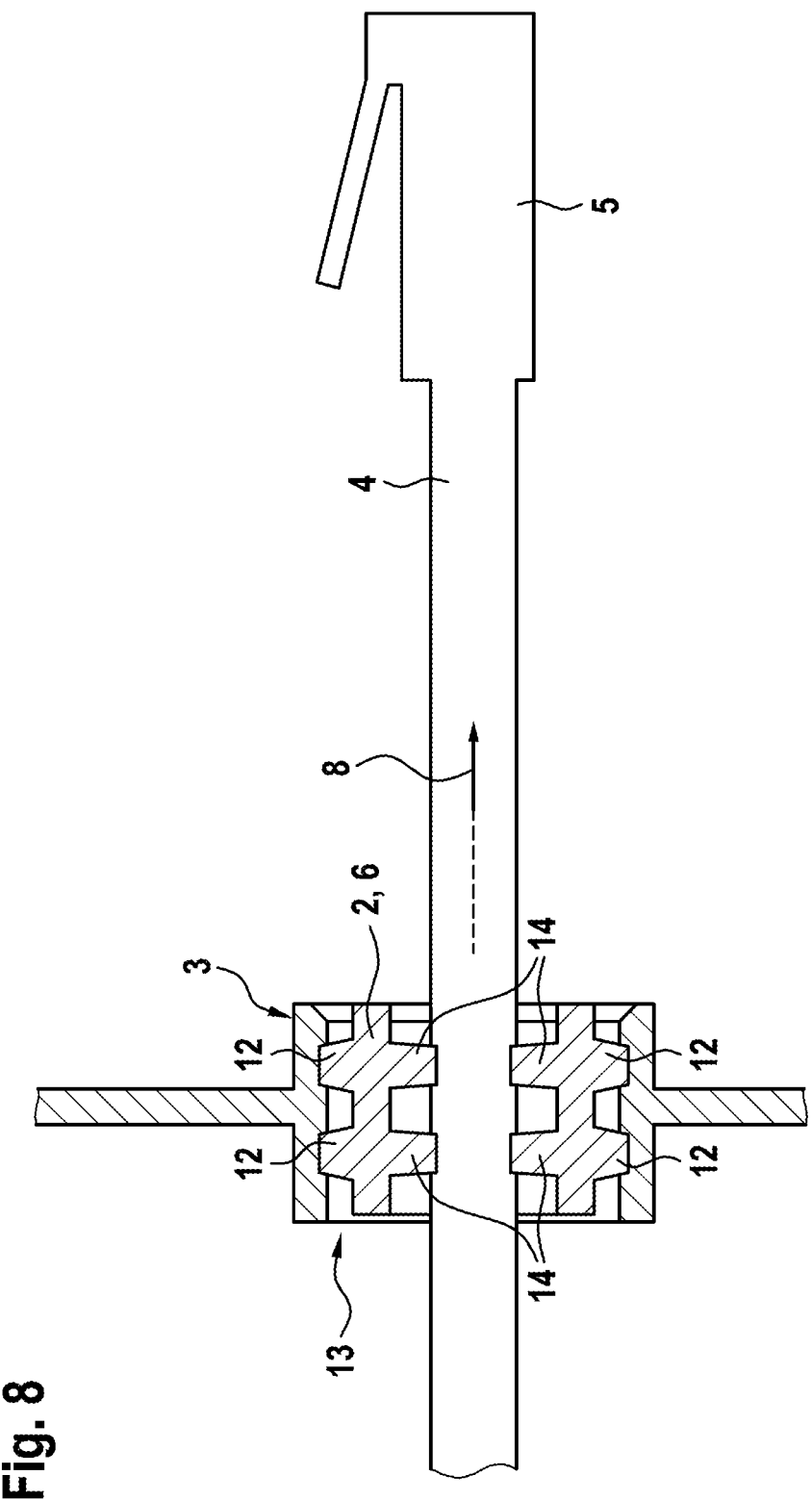
Figure 9:
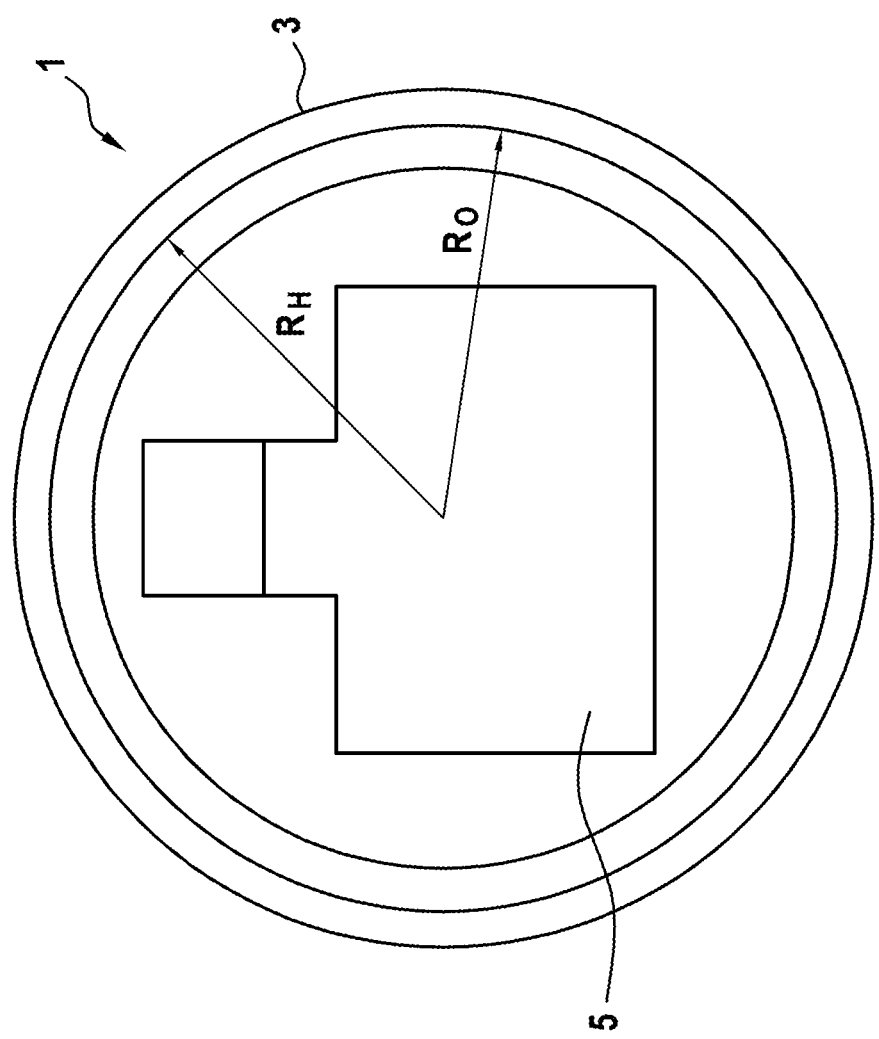
Figure 10:
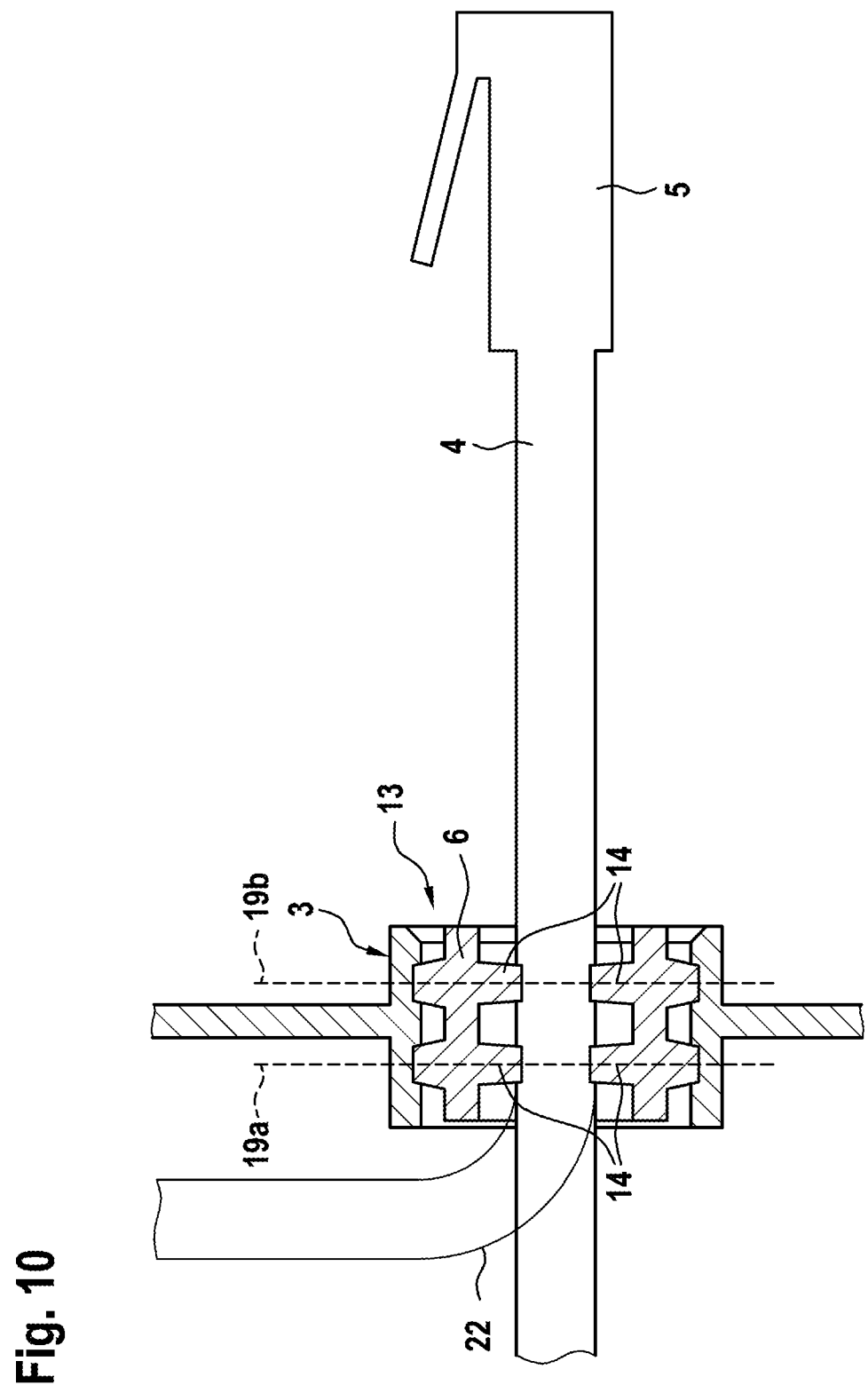
Figure 11:
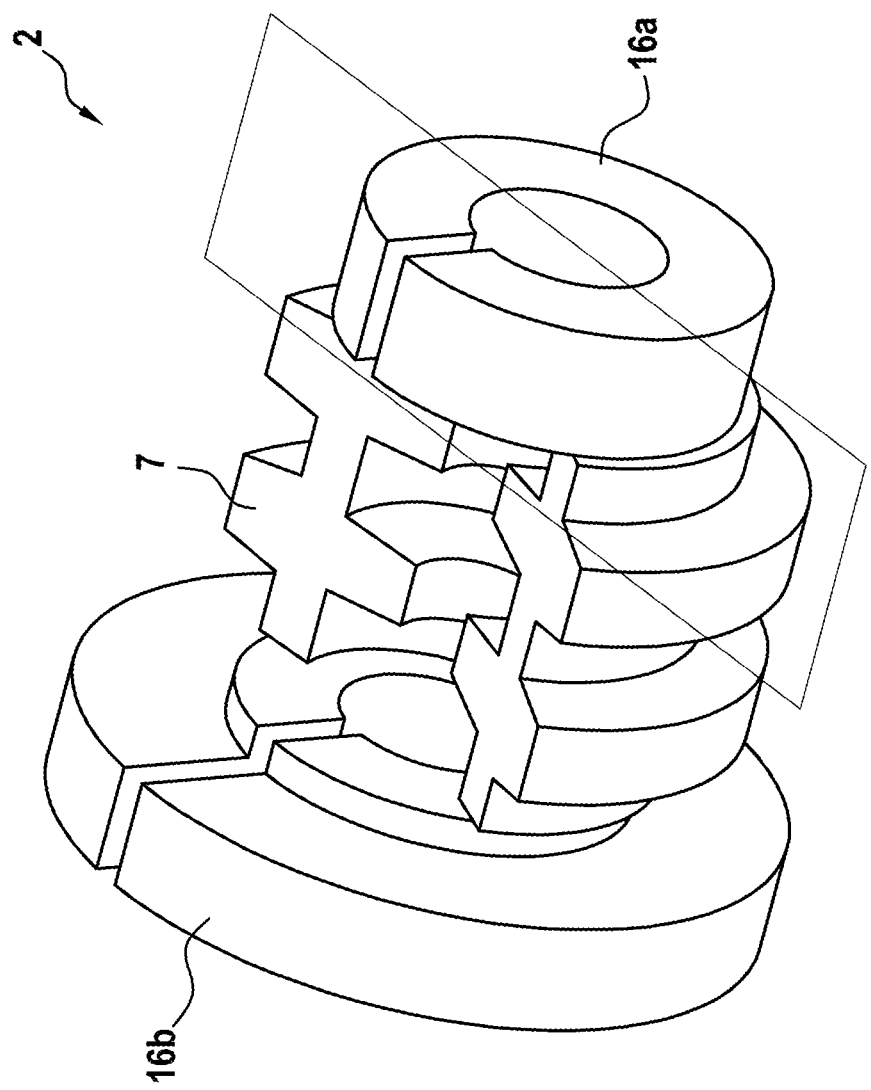
Figure 12:
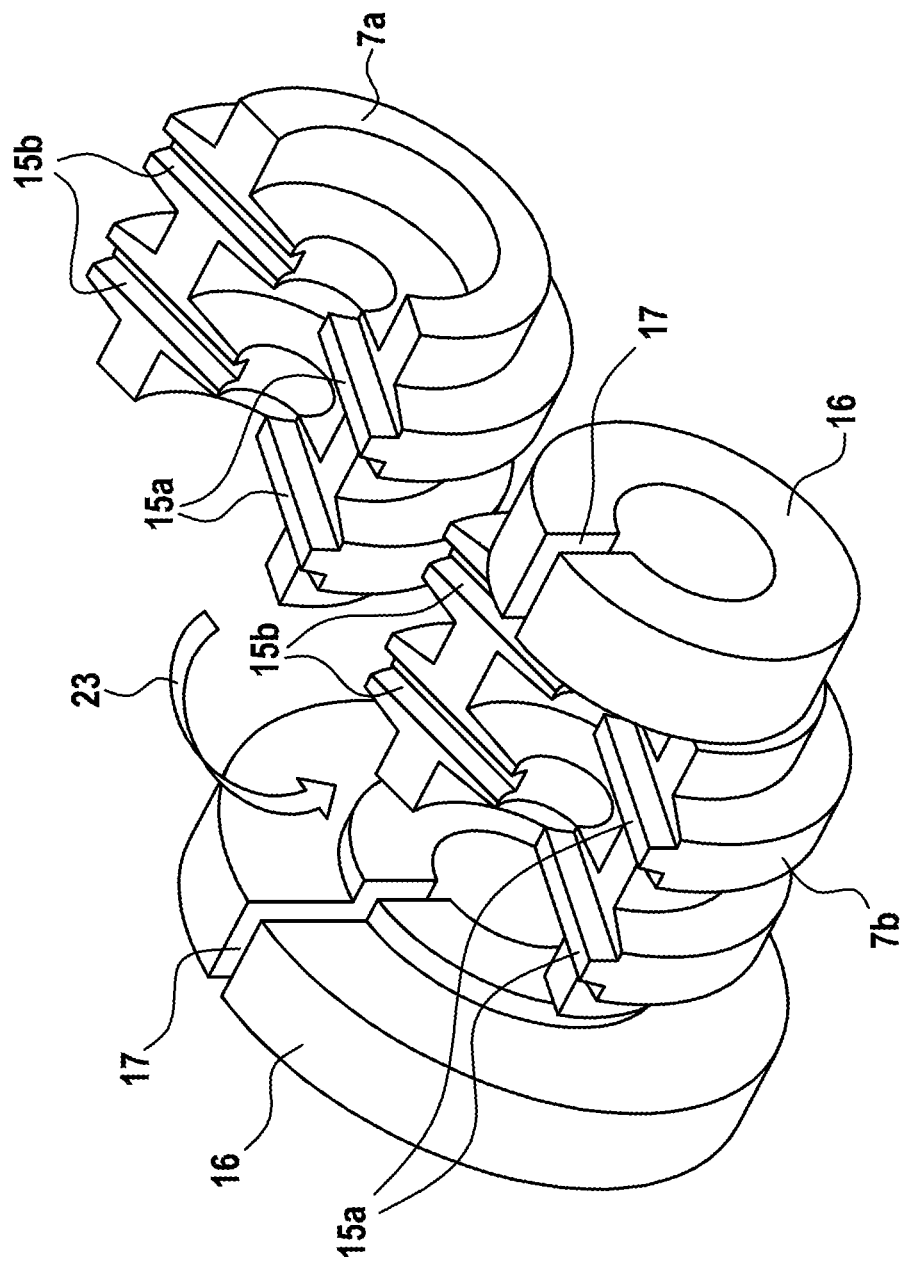
Figure 13:
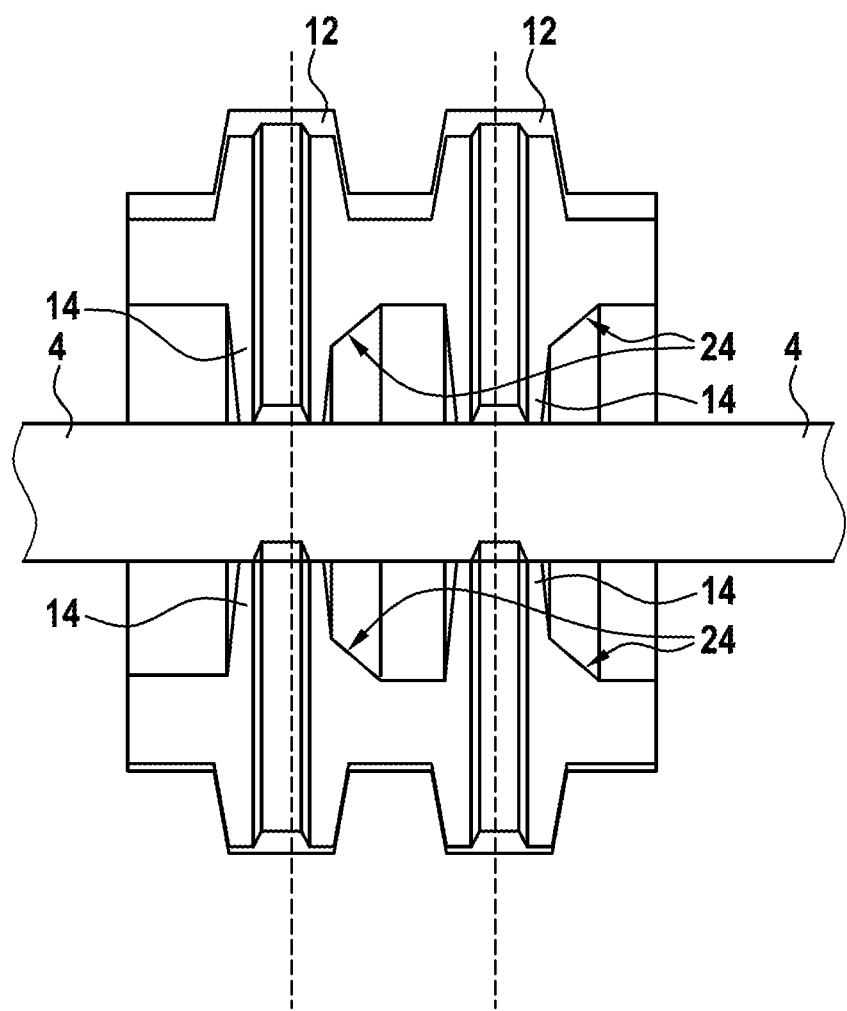
Figure 14:
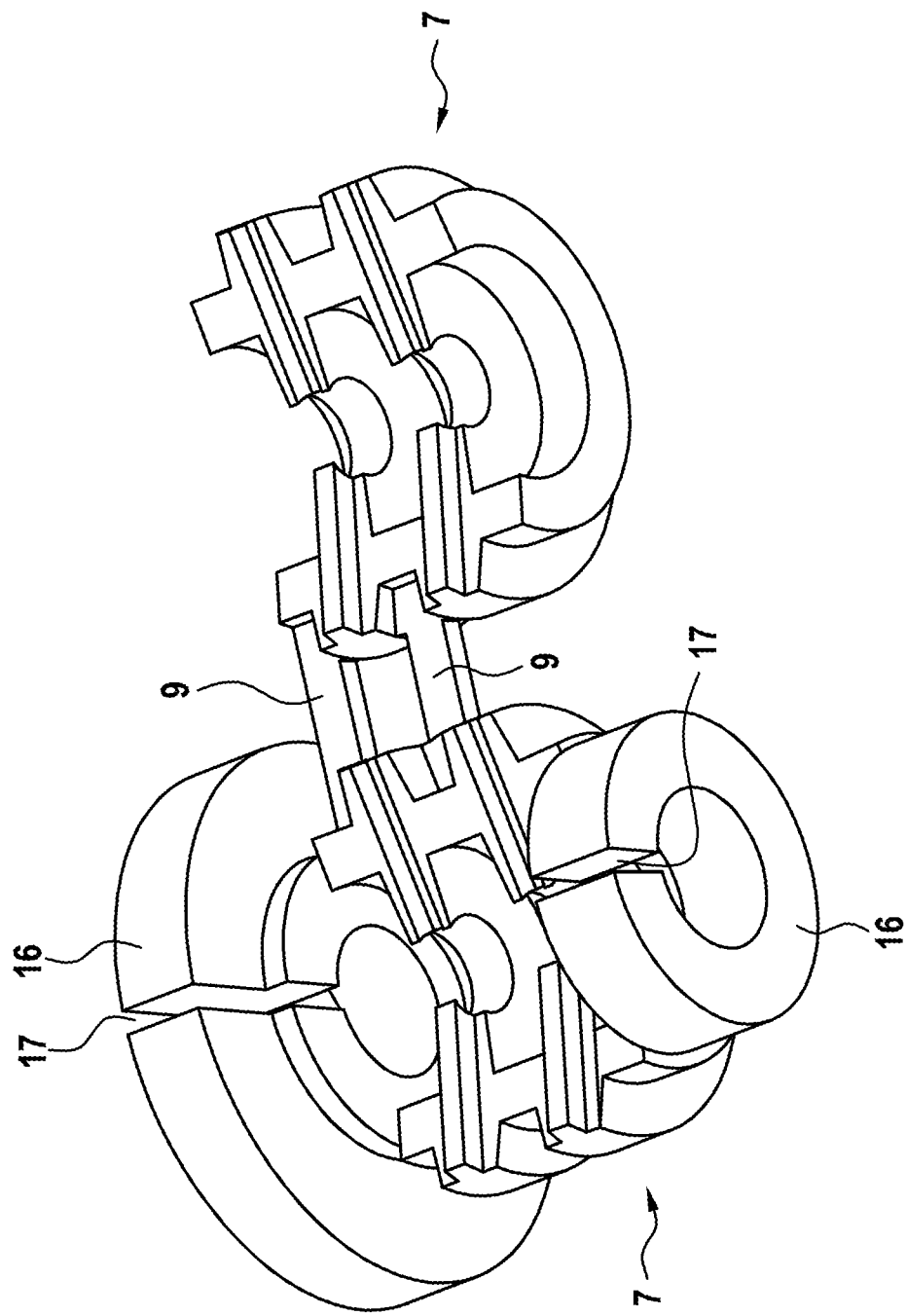
Figure 15:
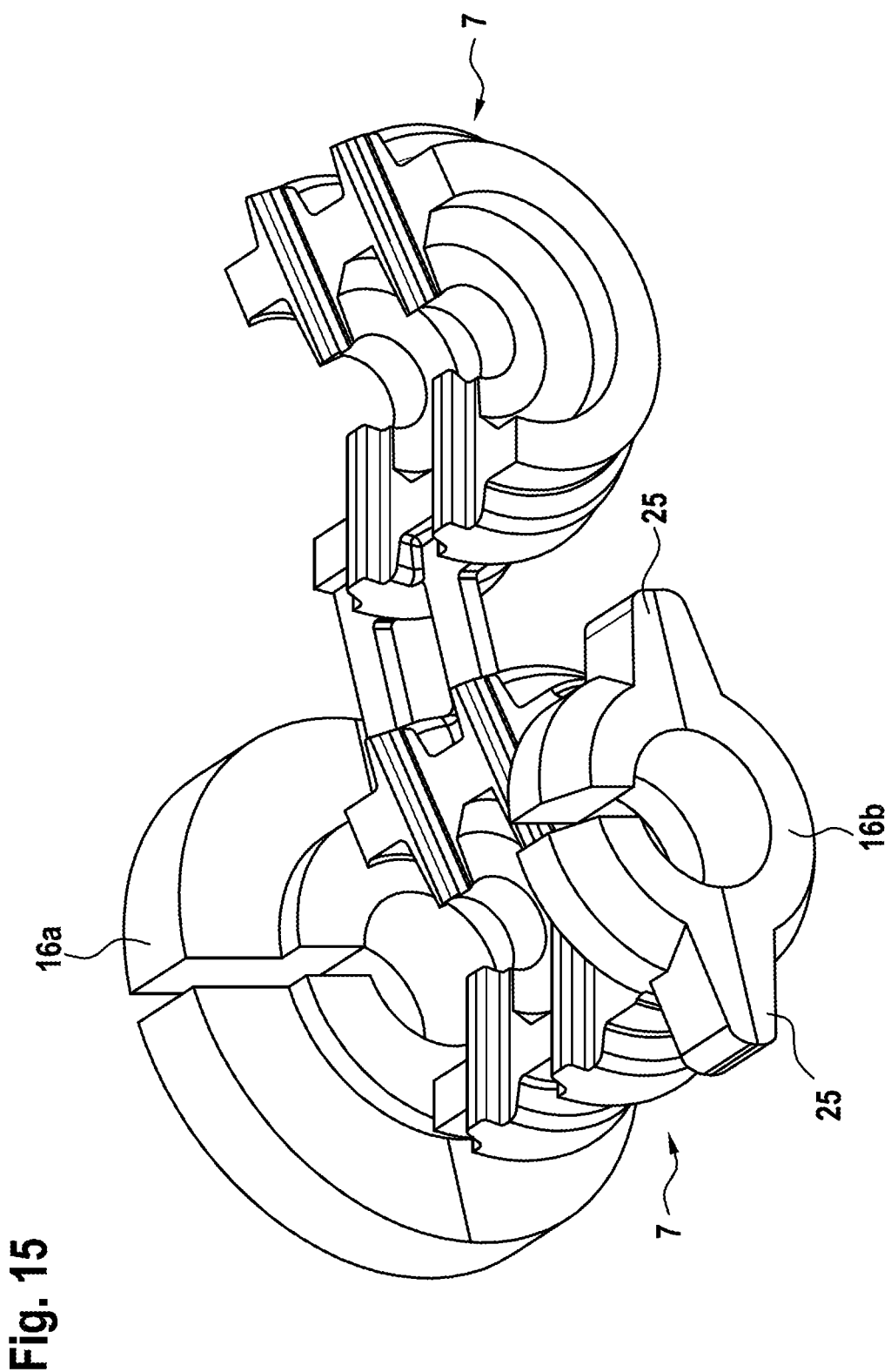
Figure 16:
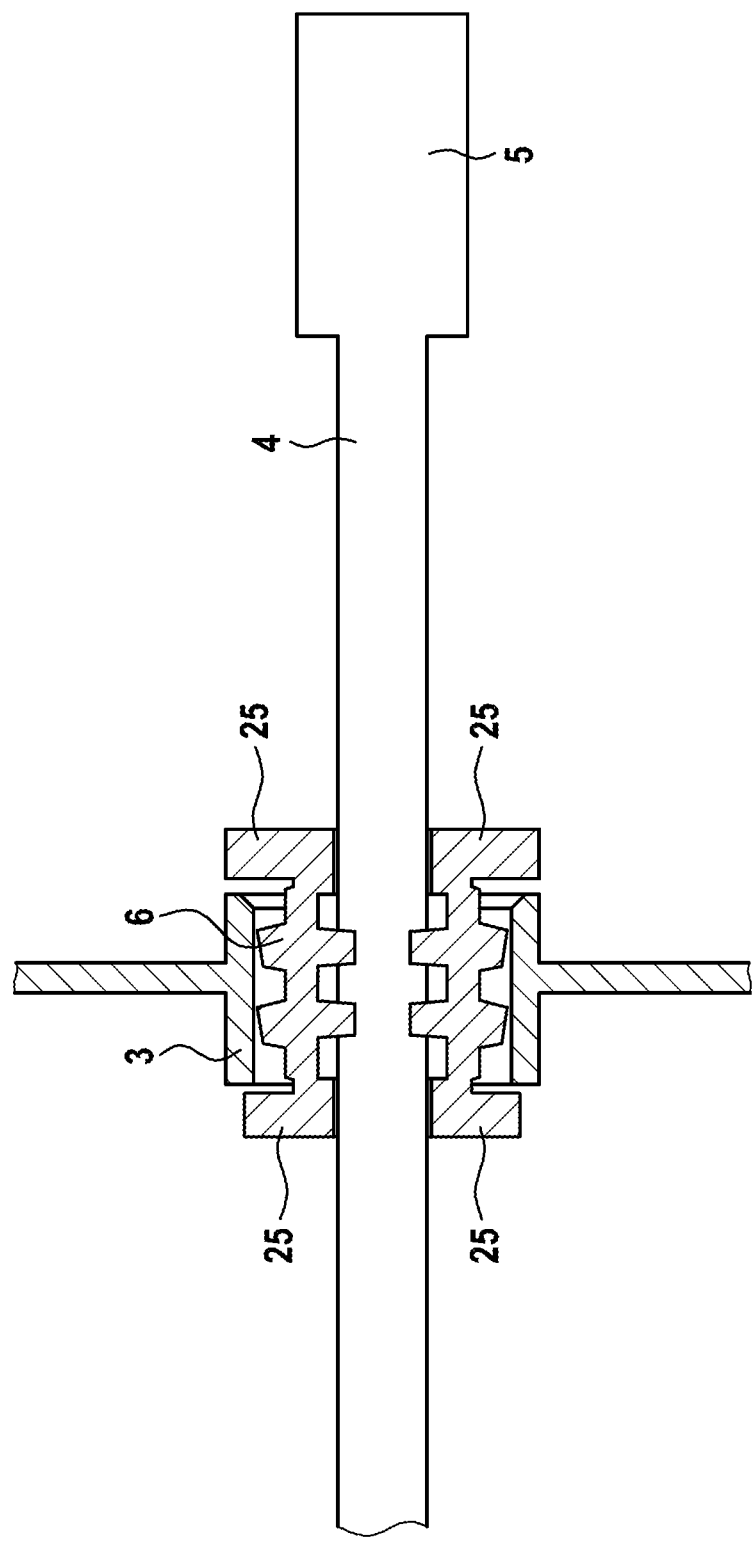

FIG. 1 shows a grommet arrangement;
FIG. 2 shows a bottom view of the grommet arrangement;
FIG. 3 shows a sectional view of the grommet arrangement;
FIG. 4 shows two body parts in the detached state;
FIG. 5 shows one body part;
FIG. 6 shows two body parts in the aligned state;
FIGS. 7 and 8 show a sectional views of the grommet arrangement with the cable;
FIG. 9 shows an axial view on the grommet arrangement;
FIG. 10 shows a sectional views of the grommet arrangement with bended cable;
FIG. 11 shows a sectional views of the grommet arrangement with disk elements;
FIG. 12 shows the grommet with assembling direction;
FIG. 13 shows the grommet with chamfers;
FIG. 14 shows the grommet with hinges;
FIG. 15 16 show the grommet with indication means;

FIG. 1 shows a grommet arrangement 1, whereby the grommet arrangement 1 comprises a grommet 2 and a cable bushing 3. The grommet 2 is adapted to seal a cable 4 that is passing through the cable bushing 3, especially sealing it against water and dust. Especially, the grommet as amply is adapted to seal a cable 4 with a header 5 in the cable bushing 3. The cable bushing may be mounted in the wall and/or the hole in the wall. The grommet 2 maybe used without removing the header 5 of the cable 4.

The grommet 2 comprises a sleeve body 6. The sleeve body 6 comprises two body parts 7, whereby the body parts 7 build the sleeve body 6 when they are combined. The sleeve body 6 is shown in its detached state, whereby the body parts 7 are not in there aligned position and combined together. The sleeve body 6 is in its detached state a rotational body, with a rotational symmetry according to the symmetry axis 8, whereby the symmetry axis 8 is the axial direction and the direction of the section of the cable that is enclosed by the sleeve body 6.

The two body parts 7 connected with a hinge 9. The hinge 9 is especially a flexible hinge 9 that allows to combine the body parts 7 to form the sleeve body 6 in its aligned state with its rotational symmetry. Each of the body parts 7 comprises two inner sealing sections 10 and two outer sealing sections 11. The outer sealing sections 11 and the inner sealing sections 10 are protrusions or bulges of the sleeve body 6 in radial outward direction. In the aligned state of the body parts the outer sealing sections 11 build an outer sealing lip 12, whereby the outer sealing lip 12 is adapted to seal the grommet in the cable bushing 3, especially in the opening 13 of the cable bushing 3.

Each of the body parts 7 comprises two inner sealing sections 10. The inner sealing sections 10 are bulges and/or protrusions in radial inward direction. The inner sealing sections 10 are facing towards the section of the cable 4 in the aligned state. Especially, in the aligned state the inner sealing sections 10 are connected to build a inner sealing lip 14. The inner sealing section 10 and the outer sealing sections 11 are preferably ring segments, also called ring elements. The ring segments are especially cylinder-elements or cylinder-segments.

The body parts 7 comprises connection means 15, whereby the connection means 15 are adapted to fix the body parts 7 in the aligned state of the sleeve body 6. Especially, the connection means 15 are adapted as detachable connection between the two body parts 7.

The grommet 2 comprises also a disk element 16, whereby the disk element 16 is placed at the axial end of the sleeve body 6 that is facing toward the header 5. The disk element 16 has an annular gap 17, whereby the annular gap 17 is adapted for inserting the cable 4 in the disk-element 16. The disk element 16 has further a annular opening in its centre, whereby the cable 4 is insurable in the opening of the disk element 16.

The grommet 2 has also indication means 18, whereby the indication means are adapted to show a user of the grommet arrangement and/or a user of the grommet 2 the right position and/or the right depth of the sleeve body in the cable bushing 3.

FIG. 2 shows the grommet arrangement 1 from FIG. 1 in a bottom view. The grommet arrangement 1 comprises the same components as described in FIG. 1. The sleeve body 6 has an outer diameter that, when the cable is positioned inside, is a little bit larger than the diameter of the opening of the cable bushing 3. The sleeve body 6 is installable in the opening 13 of the cable bushing 3. When the sleeve body 6 in its aligned state is inserted in the opening 13 the sleeve body 6 is sealing the cable 4 and/or is sealing the opening 13 of the cable bushing 3. The outer sealing lips of the sleeve body 6 are sealing the connection of the sleeve body 6 with the opening 13 of the cable bushing 3, where in the inner sealing lips 14 are sealing the connection of the cable 4 with the sleeve body 6. The disk element 16 has a larger diameter than the sleeve body 6 and in this embodiment the disk element 16 has a larger diameter than the opening 13 of the cable bushing 3.

FIG. 3 shows a sectional view of the grommet arrangement 1, whereby the sectional we shows a cutting along the axial direction of the grommet 2. The grommet 2 and especially the sleeve body 6 is in this figure already inserted in the opening 13 of the cable bushing 3. The cable 4 is passing the opening 13 of the cable bushing 3 in its centre. The cable 4 is aligned in the centre of the sleeve body 6. The cable 4 is in direct contact with the inner sealing lips 14. The inner sealing lips 14 are contacting the cable 4 as a ring. The inner sealing lips 14 are adapted to seal the contact of the sleeve body 6 with a cable 4.

The outer sealing lips 12 are in direct contact with the opening 13 and/or restriction of the opening 13 of the bushing 3. The outer sealing lips 12 are adapted to seal the contact of the sleeve body 6 with the cable bushing 3. Especially, the sleeve body 6 and/or the grommet 2 is adapted to seal the opening 13 of the cable bushing 3.

The contacts of the outer sealing lips 12 and the inner sealing lips 14 are at the same axial places and this places are forming sealing zones 19. The sealing zones 19 and therefore the inner sealing lips 14 and the outer sealing lips 12 are separated in axial direction, whereby preferably the axial distance between them is smaller than one centimetre and larger than two millimetres.

FIG. 4 shows a view in axial direction on the sleeve body 6 in its detached state. The sleeve body 6 comprises two body parts 7a and 7b, whereby the body parts 7a and 7b are congruent. The body parts 7a and 7b are ring segments with an outer sealing radius $R_O$. The ring segments have an inner radius $R_I$. The ring segments have an central angle α, whereby α is larger than 180 degrees and for example 200 degrees. The cable 4 has a radius $R_c$, whereby $R_c$ is larger and/or equal to $R_i$. In the detached state, especially short before the sleeve element 6 is brought into the aligned state the body parts 7a and 7b are arranged that the openings of the ring segments are facing each other. The cable 4 is at this state between the openings of the body parts 7a and 7b, whereby the cable can slip and/or be inserted in the circular cut out of the body parts 7a and/or 7b. The annular cut-out of the body parts 7a and 7b with the radius $R_i$ are building the inner seal section 10 in the detached state. Also shows in the figure is the contact area 20 of the ring segments and/or body parts 7a and 7b in the aligned state.

FIG. 5 shows one body element 7 of the body elements 7a and 7b in FIG. 4 with indications in which way the ring segment and/or body parts 7 are crumbled when they are brought from the detached state in to the aligned state. The body part 7 is shown in the detached state with a central angle α. The body element 7 has an inner radius $R_I$ in the detached state. When the cable 4 is brought into the ring segment or in to the body part 7 and when the sleeve body 6 is brought into the aligned state the central angle is deformed in to a central angle α*, whereby the central angle α* is preferably 180 degrees. By deforming the central angle α to the centre angle α* the ring segment is at its open ends deformed by an angle Δα. Also by inserting the cable 4 in to the body part 7 the inner radius $R_i$ of the body part 7 is increased to an radius $R^*_i$, whereby $R^*_i$ is preferable the radius $R_c$ of the cable 4. The edges 21 of the opening of the ring segment and/or the body parts 7 are displaced when inserting the cable 4, whereby the displacement 22 is shown in this figure and is radial outwardly. The outer radius R0 also is displaced and increases to $R_O^*$.

FIG. 6 shows the two body parts 7a and 7b when there brought into the aligned state of the sleeve body 6: Also indicated in this figure are the eges 21a and 21b of the body parts 7a and 7b. In the aligned state the body parts 7a and 7b are contacting in the contact area 20. The changes of the central angle Δα and the change ΔR of the inner radius $R_i$ is also indicated.

FIG. 7 shows the grommet arrangement 1 at a stadium the grommet 2 and/or sleeve body 6 is not inserted in the opening 13 of the cable bushing 3. The sleeve body 6 is inclosing the cable 4, whereby the sleeve body 6 is building a cylindrical cuff around the cable 4 and/or at least around a section of the cable 4. The sleeve body 6 is contacting the cable with the inner sealing lips 14. The inner sealing lips 14 are a ring around the cable 4, whereby the inner sealing lip 14 has a radius $R_i$. The radius $R_i$ is in the aligned state the radius $R_c$ of the cable 4. The inner sealing lips 14 are bulges of the sleeve body 6.

The sleeve body 6 has an outer sealing lip 12, whereby the outer sealing lip 12 is a ring around the section of the cable 4. The outer sealing lip 12 has a radius of $R_O$, whereby $R_O$ is preferably the radius $R_H$ of the opening 13. Preferably, the radius $R_O$ is a little bit smaller, for example 100 to 500 micrometres smaller, than the radius $R_H$. $R_O$ *1 is slightly bigger than $R_H$, for example 450 to 1000 micrometres bigger The outer sealing lips 12 and the inner sealing lips 11 are preferably rectangular, triangular or trapezoidal bulges of the sleeve body 6.

FIG. 8 shows the grommet arrangement 1 of FIG. 7, at this state when the grommet 2 and/or the sleeve body 6 is inserted in the opening 13 of the cable bushing 3. The sleeve body 6 and/or the grommet 2 is inserted in the opening 13 in a way, that the outer sealing lips 12 are contacting the wall of the opening 13, whereby this contact is seal by the outer sealing lips 12. The inner sealing lips 14 are contacting the cable 4 in the way, that the inner sealing lips 14 are sealing this contact. Therefore, the sleeve body 6 and/or the grommet 2 is sealing the opening 13 of the cable bushing 3. The grommet 2 is sealing this opening 13 against the water, waterspray and/or bust, especially it is impossible for matter to past the opening 13.

FIG. 9 shows the grommet arrangement 1 when the grommet 2 is inserted into the cable bushing 3. The cable bushing 3 has an opening 13, whereby this opening 13 has a radius $R_H$. In this opening the grommet 2 and/or the sleeve body 6 is inserted. The sleeve body 6 has an outer radius $R_O$, whereby this radius is the radius of the outer sealing lip 12. The outer sealing lip 12 is contacting the opening 13 of the cable bushing 3, whereby this contact is sealing the opening 13 of the cable bushing 3. The figure shows that there is a full 360 degree radial compression of the outer sealing lip 12. Also the inner sealing lip 14 is contacting the cable 4, whereby this contact is also a full 360 degree radial compression to seal this area.

FIG. 10 shows a sectional view of the grommet arrangement 1. The grommet arrangement 1 is built like the grommet arrangement 1 in FIG. 8. The grommet arrangement 1 in this figure does not comprise a disk element 16. Without using the disk element 16 it may happens that the cable 4 is bend with a bending zone 22. For example the cable 4 has at the side of the header a horizontal extension and after passing the cable bushing 3 the cable 4 has a vertical extension, whereby the changing from the horizontal direction into the vertical direction causes the bending zone 22. So it may happen, that the bending zone 22 is curved in a way, that the contact to the inner sealing lips 14 is not full provided, for example in this figure the sealing at the inner sealing lip 14 in the sealing zone 19a is not completely provided.

To reduce this problem the grommet 2 comprises two disk elements 16a and 16b, whereby the disk element 16a is arranged at the axial end that faces towards the header, whereby the disk element 16 is arranged at the axial end of sealing body 6 that is averted from the header 5. The disk elements 16a and 16b are hollow cylinders, whereby the hollow cylinders have an angular gap 17, whereby the angular gap 17 maybe used for inserting the cable 4 into the hollow cylinder. The positioning of the angular gap 17 is such that protects area 12 from the cable when it's bent. The disk elements 16a and 16b have an axial extension of at least two millimetres, preferably of more than 5 millimetres and special of more than one centimetre. The disk elements 16a and 16b are adapted to fix the cable 4 in a way, that the cable 4 is penetrating the sleeve body 6 in a perpendicular way and/or as penetrating the sleeve body 9 in an adjustable angle. Especially, the disk elements 16a and 16b are stiff bodies to ensure that the penetrating angle into the sleeve body 6 is fixed. Especially, the disk element 16a and 16b avoid the bending of the cable 4 when entering the sleeve body 6.

FIG. 12 shows the grommet 2 with the two body parts 7a and 7b and the disk-element 16a and 16b. The folding direction 23 is the direction the body part 7a has to follow to fix and/or build the sleeve body 6. The body parts 7a and 7b comprises connection means 15a and 15b. The connection means 15a and 15b are adapted to fix and/or maintain a fix combination of the two body parts 7a and 7b in the aligned state of the sleeve body 7. For example the connection means 15a and 15b are adapted as a snap lock or a clip closure. Preferably, the connection means 15a and 15b are adapted as tongue and groove, whereby in this figure the connection means 15a are the tongue and the connection means 15b are the groove. The connection means 15a and 15b can also be adapted as pins and hollows. Connection means 15a and 15b maintain the two half's and/or maintain the two body parts 7a and 7b even when they slide over the cable 4 into the opening 13 of the cable bushing 3 aligned.

FIG. 13 shows a sectional view of the grommet arrangement 1. The cable 4 is inserted and fixed in the sleeve body 6, whereby the cable 4 is contacting the inner sealing lips 14. The inner sealing lips 14 are adapted as bulges of the sleeve body 6. The inner sealing lips 14 and/or the bulges are contacted with the sleeve body 6, whereby this contact contains a chamfers 24. The chamfer 24 is facing toward the cable 4 and its adapted 2 reduce the axial flexibility of the inner sealing lips 14. The chamfer 24 is in this figure only on one axial side of the inner sealing lips 14, whereby the chamfer 24 can also be in another embodiment on both of axial sides of the inner sealing lip 14.

FIG. 14 shows a grommet 2 with two body parts 7 and 7b and two disk-elements 16a and 16b. The two body parts 7a and 7b are connected via a hinge 9. The hinge 9 is specially a living hinge. The hinge 9 is adapted to facilitate the handling of the two body parts 7a and 7b. The hinge 9 is preferably connected with a first body part 7a at a pivot point and the hinge 9 is connected with a second body part 7b also at a pivot point.

FIG. 15 shows a grommet 2 with a sleeve body 6, whereby the sleeve body 6 comprises two body parts 7a and 7b that are connected with the hinge 9. The grommet 2 also comprises two disk elements 16a and 16b. The disk element 16b comprises indication means 25, whereby the indication means 25 are adapted as notches. The indication notches are adapted as a visual and manual feedback when positioning of the grommet in the cable bushing 3 is completed and/or correct.

FIG. 16 shows the grommet arrangement 1 one from FIG. 8, whereby this grommet arrangement comprises the indication means 25. The indication means 25 are showing the user the right positioning of the sleeve body 6 in the cable bushing 3. Especially the indication means 25 does not allow wrong depth of the sealing lips in the opening 13 of the cable bushing 3.

What is claimed is:

1. A grommet (2) for sealing a cable (4) in a cable bushing (3), the grommet comprising a sleeve body (6), wherein the sleeve body (6) has an inner sealing lip (14) for sealing the cable (4) in the sleeve body (6) and an outer sealing lip (12) for sealing the sleeve body (6) in the cable bushing (3), wherein the sleeve body (6) comprises a first body part (7, 7a) and a second body part (7, 7b), and wherein the sleeve body (6) has a detached state and an aligned state, wherein in the detached state the first and second body parts (7, 7a, 7b) are detached to insert the cable (4), and wherein in the aligned state the first and second body parts (7, 7a, 7b) are aligned to form the inner sealing lip (14) and the outer sealing lip (12), wherein each of the first and second body parts (7, 7a, 7b) has two end surfaces extending from a radially inner sealing section (10) to a radially outer sealing section (11), wherein the inner and outer sealing sections (10, 11) extend between the two end surfaces, wherein in the aligned state the inner and outer sealing sections (10, 11) of one or both of the first and second body parts (7, 7a, 7b) are crumpled, wherein in the aligned state one of the inner and outer sealing sections (10, 11) of the first body part (7, 7a) contacts a corresponding one of the inner and outer sealing sections (10, 11) of the second body part (7, 7b) to form a corresponding one of the inner and outer sealing lips (12, 14), and wherein one of the inner and outer sealing sections (10, 11) of both of the first and second body parts (7, 7a, 7b) is a circular ring segment that, in the detached state, has a centre angle (a) and an inner radius (R1, RO), and wherein in the aligned state one of the inner and outer sealing sections (10,11) of both of the first and second body parts (7, 7a, 7b) is crumpled to reduce the centre angle (α*) and to enlarge the inner radius (R*1, R*O).

2. The grommet (2) as set forth in claim 1, characterized that the first and second body parts (7, 7a, 7b) are foldable to convert the sleeve body (9) from the detached state into the aligned state.

3. The grommet (2) as set forth in claim 1, characterized in that in the aligned state the sleeve body (6) is configured to enclose a section of the cable (4), wherein the inner sealing lip (14) is configured to face the section of the cable (4).

4. The grommet (2) as set forth in claim 1, characterized in that sleeve body (7, 7a, 7b) is formed by two body parts (7, 7a, 7b), wherein in the detached state the centre angles (a) are larger than 180 degrees, and wherein in the aligned state the centre angles (a*) are 180 degrees.

5. The grommet (2) as set forth in claim 1, characterized in that the first and second body parts (7, 7a, 7b) comprise connection means (15, 15a, 15b) to maintain a fixed connection of the first and second body parts (7, 7a, 7b) in the aligned state.

6. The grommet (2) as set forth in claim 5, characterized in that in the aligned state the first and second body parts (7, 7a, 7b) are contacted at contact areas, wherein the contact areas comprise the connecting means (15, 15a, 15b) and are a slot and a key.

7. The grommet (2) as set forth in claim 1, characterized in that the sleeve body (6) has one of at least two inner sealing lips (14) and at least two outer sealing lips (12), wherein in the aligned state one of the inner sealing lips (14) and the outer sealing lips (12) are spaced in an axial direction of the sleeve body (6).

8. The grommet (2) as set forth in claim 1, characterized in that the grommet (2) comprises a disc element (16, 16a, 16b) at at least one axial end of the sleeve body (6), wherein the disc element (16, 16a, 16b) is adapted to maintain one of a perpendicular penetration and a penetration under an adjusted angle of the cable (4) into the sleeve body (6).

9. The grommet (2) as set forth in claim 1, characterized in that one of the grommet (2) and the sleeve body (6) has indication means (25) for indicating a desired position of the grommet (2) in the cable bushing (3).

10. The grommet (2) as set forth in claim 1, characterized in that one of the inner sealing lips (14) and the outer sealing lips (12) is a protrusion of the sleeve body (6), wherein the protrusion is chamfered towards the sleeve body (6) to reduce its axial flexibility.

11. The grommet (2) as set forth in claim 1, wherein the grommet (2) is configured to seal against one of dust and water splash.

12. A grommet arrangement (1) for feeding a cable (2) through a wall, the grommet arrangement comprising:
the grommet (2) as set forth in claim 1; and
a cable bushing (3),
wherein the cable bushing (3) has an inner opening (13) and is attachable in a hole of the wall, and
wherein the grommet (2) is mountable in the opening (13) of the cable bushing (3) for feeding the cable (4) through the wall and sealing the opening (13).

13. The grommet arrangement (1) as set forth in claim 12, further comprising the cable (4), wherein the cable (4) has an outer diameter, and wherein one of the inner and outer sealing sections (10, 11) of each of the first and second body parts (7, 7a, 7b) is a ring segment, wherein each of the ring segments has an inner diameter, wherein in the detached state the inner diameters of the ring segments are smaller than the outer diameter of the cable (4), and in the aligned state the first and second body parts (7, 7a, 7b) are crumpled to adapt the inner diameter of the ring segments to the outer diameter of the cable (4).

14. The grommet (2) as set forth in claim 1, wherein the two end surfaces are not coplanar.

15. The grommet (2) as set forth in claim 1, characterized that the first and second body parts (7, 7a, 7b) are combinable to convert the sleeve body (9) from the detached state into the aligned state.

16. The grommet (2) as set forth in claim 1, characterized in that in the aligned state the sleeve body (6) is configured to enclose a section of the cable (4), wherein the inner sealing lip (14) is configured to contact the section of the cable (4).

17. The grommet (2) as set forth in claim 5, characterized in that in the aligned state the inner sealing sections (10) are contacted at contact areas, wherein the contact areas comprise the connecting means (15, 15a, 15b) and are a slot and a key.

18. The grommet (2) as set forth in claim 5, characterized in that in the aligned state the outer sealing sections (11) are contacted at contact areas, wherein the contact areas comprise the connecting means (15, 15a, 15b) and are a slot and a key.

19. A grommet (2) for sealing a cable (4) in a cable bushing (3), the grommet comprising a sleeve body (6), wherein the sleeve body (6) has an inner sealing lip (14) for sealing the cable (4) in the sleeve body (6) and an outer sealing lip (12) for sealing the sleeve body (6) in the cable bushing (3), wherein the sleeve body (6) comprises a first body part (7, 7a) and a second body part (7, 7b), and wherein the sleeve body (6) has a detached state and an aligned state, wherein in the detached state the first and second body parts (7, 7a, 7b) are detached to insert the cable (4), and wherein in the aligned state the first and second body parts (7, 7a, 7b) are aligned to form the inner sealing lip (14) and the outer sealing lip (12),
wherein each of the first and second body parts (7, 7a, 7b) has two end surfaces extending from a radially inner sealing section (10) to a radially outer sealing section (11), wherein the inner and outer sealing sections (10, 11) extend between the two end surfaces, wherein each of the inner and outer sealing sections is a circular ring segment that, in the detached state, has an inner radius (R1, RO) and a centre angle (a) larger than 180 degrees between the two end surfaces, and
wherein in the aligned state each of the inner and outer sealing sections (10, 11) of the first body part (7, 7a) contact a corresponding one of the inner and outer sealing sections (10, 11) of the second body part (7, 7b) to form a corresponding one of the inner and outer sealing lips (12, 14), and wherein in the aligned state each of the inner and outer sealing sections (10, 11) of each of the first and second body parts (7, 7a, 7b) is crumpled to reduce the centre angle (a*) and to enlarge the inner radius (R*1, R*O).

20. A grommet (2) for sealing a cable (4) in a cable bushing (3), the grommet comprising a sleeve body (6), wherein the sleeve body (6) has an inner sealing lip (14) for sealing the cable (4) in the sleeve body (6) and an outer sealing lip (12) for sealing the sleeve body (6) in the cable bushing (3), wherein the sleeve body (6) comprises a first body part (7, 7a) and a second body part (7, 7b), and wherein the sleeve body (6) has a detached state and an aligned state, wherein in the detached state the first and second body parts (7, 7a, 7b) are detached to insert the cable (4), and wherein in the aligned state the first and second body parts (7, 7a, 7b) are aligned to form the inner sealing lip (14) and the outer sealing lip (12), wherein each of the first and second body parts (7, 7a, 7b) has two end surfaces extending from a radially inner sealing section (10) to a radially outer sealing section (11), wherein the inner and outer sealing sections (10, 11) extend between the two end surfaces, wherein in the aligned state the inner and outer sealing sections (10,11) of one or both of the first and second body parts (7, 7a, 7b) are crumpled, wherein the first and second body parts (7, 7a, 7b) comprise connection means (15, 15a, 15b) to maintain a fixed connection of the first and second body parts (7, 7a, 7b) in the aligned state, and wherein the aligned state the inner sealing sections (10) are contacted at contact areas, wherein the contact areas comprise the connecting means (15, 15a, 15b) and are a slot and a key.

21. A grommet (2) for sealing a cable (4) in a cable bushing (3), the grommet comprising a sleeve body (6), wherein the sleeve body (6) has an inner sealing lip (14) for sealing the cable (4) in the sleeve body (6) and an outer sealing lip (12) for sealing the sleeve body (6) in the cable bushing (3), wherein the sleeve body (6) comprises a first body part (7, 7a) and a second body part (7, 7b), and wherein the sleeve body (6) has a detached state and an aligned state, wherein in the detached state the first and second body parts (7, 7a, 7b) are detached to insert the cable (4), and wherein in the aligned state the first and second body parts (7, 7a, 7b) are aligned to form the inner sealing lip (14) and the outer sealing lip (12), wherein each of the first and second body parts (7, 7a, 7b) has two end surfaces extending from a radially inner sealing section (10) to a radially outer sealing section (11), wherein the inner and outer sealing sections (10, 11) extend between the two end surfaces, wherein in the aligned state the inner and outer sealing sections (10,11) of one or both of the first and second body parts (7, 7a, 7b) are crumpled, wherein the first and second body parts (7, 7a, 7b) comprise connection means (15, 15a, 15b) to maintain a fixed connection of the first and second body parts (7, 7a, 7b) in the aligned state, and wherein the aligned state the outer sealing sections (11) are contacted at contact areas, wherein the contact areas comprise the connecting means (15, 15a, 15b) and are a slot and a key.

\* \* \* \* \*